Figure 1:
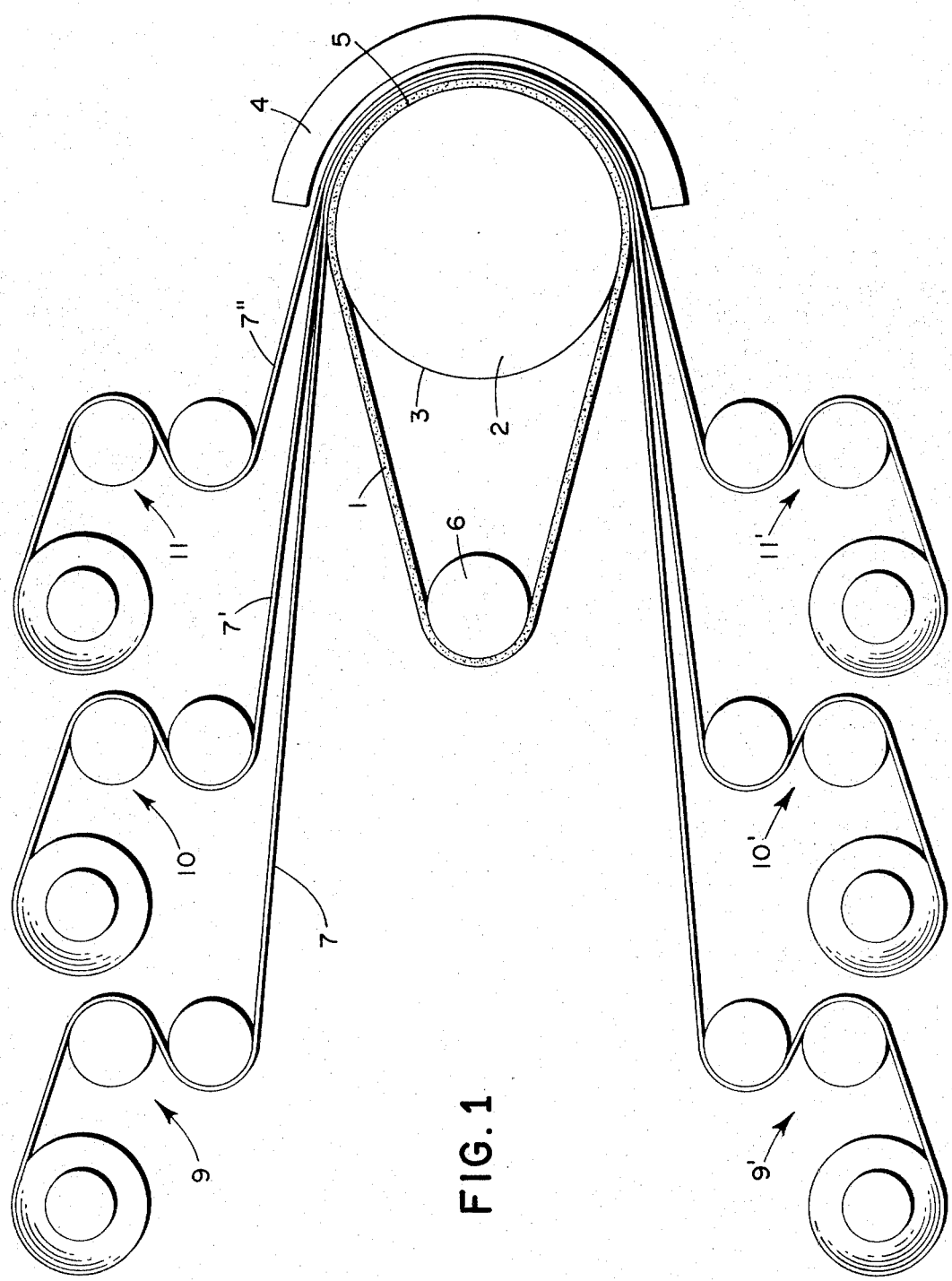

United States Patent [19]
Previati

[11] 3,730,675
[45] May 1, 1973

[54] CURING APPARATUS FOR ELONGATE ELASTOMERIC ARTICLES

[75] Inventor: Augusto Previati, Milan, Italy

[73] Assignee: Industrie Pirelli S.p.A., Milan, Italy

[22] Filed: Aug. 3, 1971

[21] Appl. No.: 168,691

[30] Foreign Application Priority Data

Aug. 7, 1970   Italy..............................28402 A/70

[52] U.S. Cl. .......................432/60, 34/123, 432/228
[51] Int. Cl...............................................F27b 9/28
[58] Field of Search ..................263/3; 34/116, 118, 34/123

[56] References Cited

UNITED STATES PATENTS 3,354,035   11/1967   Gottwald et al. ......................34/118
3,110,612   11/1963   Gottwald et al. ....................34/116 X
3,174,228   3/1965   Smith, Jr. .............................34/116 X

*Primary Examiner*—John J. Camby
*Attorney*—Stevens, Davis, Miller & Mosher

[57] ABSTRACT

The application relates to a curing apparatus for elastomeric articles of elongate shape, such as belts. The apparatus is such that a belt to be cured is passed over a heated rotating drum. This belt is pressed against the hot surface of the drum by other belt elements which are driven by a system of rollers which system includes the heated drum as a rotating element thereof.

10 Claims, 3 Drawing Figures

Patented May 1, 1973

3,730,675

2 Sheets-Sheet 1

INVENTOR
AUGUSTO PREVIATI

BY *Stevens, Davis, Miller & Mosher*
ATTORNEYS

Patented May 1, 1973

3,730,675

2 Sheets-Sheet 2

INVENTOR
AUGUSTO PREVIATI

BY Stevens, Davis, Miller & Mosher
ATTORNEYS

CURING APPARATUS FOR ELONGATE ELASTOMERIC ARTICLES

The present invention relates to an apparatus for subjecting lengthy articles of flat shape, such as belts, to an elastomeric curing treatment.

It is desired to cure elastomeric items such as long belts by means involving a continuous movement of the item through a curing station. Such continuous motion enhances uniformity of result and avoids the occurrence of localized scorching which is common to curing techniques involving heated moulds, presses, and the like.

According to the known continuous type techniques, a belt to be cured is made to travel along a path defined by a plurality of rollers, heated electrically or by fluids such as steam, whereby the curing is effected through contact of the belt with the hot roller surfaces. Conventionally, the belt to be so cured is pressed against the hot roller surfaces by a band, such as a smooth steel tape or a rubberized wire net, the band being tautly extended between respective rollers which cause it to assume a curvilinear profile. The speed of motion of the metal band is equal to the surface speed of the heated rollers which, in turn, is such as to assure proper curing of the elastomeric belt.

In practice, however, the known technique is not satisfactory because the steel band operates under considerably high stresses (it being subjected to cyclic bending stresses and to a permanent tensile stress) and therefore it must be made of high resistance materials.

For a certain diameter of the heated rollers, both the band tensile stress and its bending stress depend on the band thickness. The resultant of the two stresses being a minimum for a certain thickness, which can be calculated; however, the combination which gives the minimum value of resultant stress may be such that the corresponding tension is insufficient to provide an adequate pressure on the article being subjected to curing, especially after a certain period of operation. Consequently, the lowest resultant stress in the band does not provide the proper curing.

The present invention seeks to provide an apparatus able to subject the elastomeric article to a continuous and perfectly uniform curing. To this end, the apparatus comprises means which are not subjected to high mechanical stresses but which are adopted to maintain the article pressed against the cylinder under a high and constant pressure which may be selected as a function of the geometrical features of the article itself and of the chemical-physical characteristics of the elastomeric material used.

An object, therefore, of the present invention is the realization of an improved apparatus for curing elongate, flat surface items which comprise an elastomeric material.

Particularly, an object of this invention is the realization of an improved apparatus for curing a belt -type elastomeric article by a means whereby the article is continuously moved in a taut condition past a curing station.

Further, an object of this invention is the realization of a curing apparatus as aforementioned having an improved means for pressing the belt-type article against the heated curing roller.

Other objects are inherent in the invention as disclosed herein.

Figure 2:
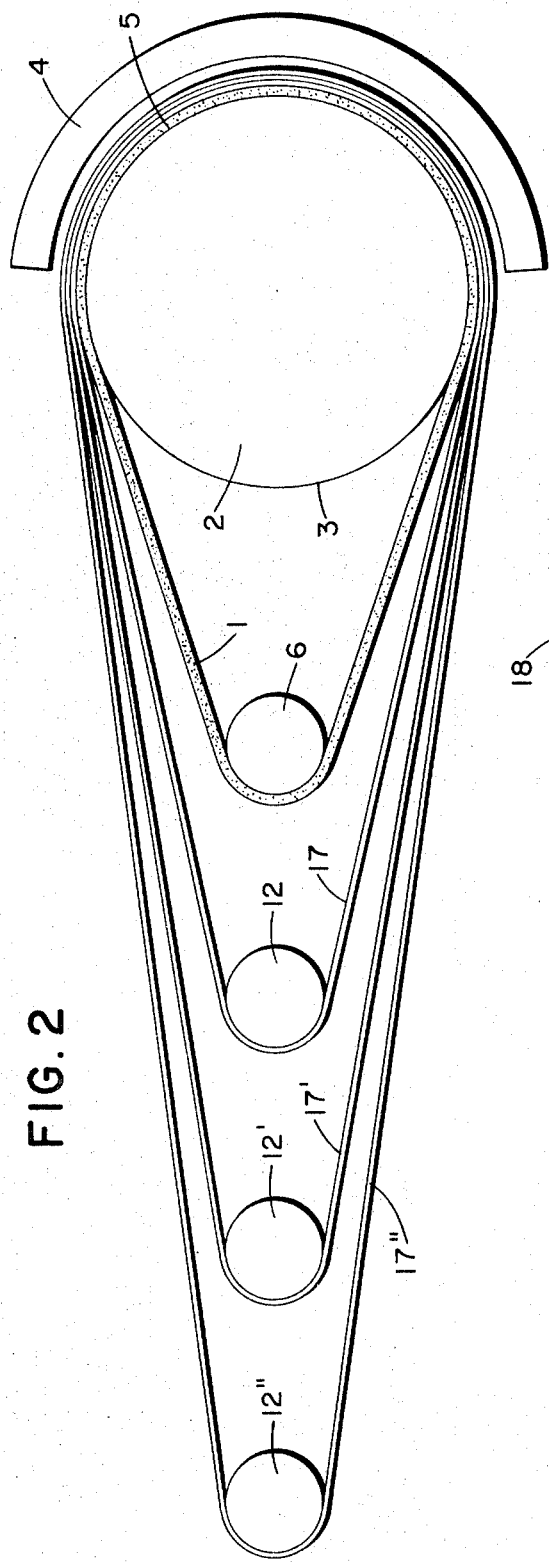
Figure 3:
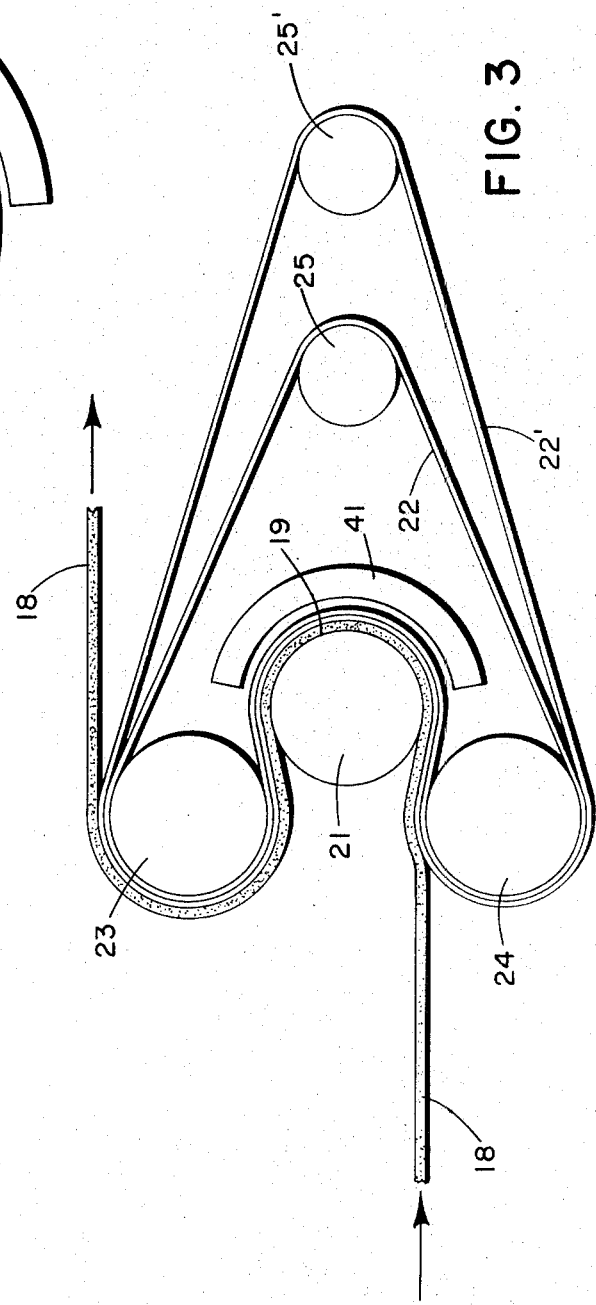

The following is a detailed description of particular embodiments of the invention with reference to the attached drawings, wherein:

FIGS. 1, 2, and 3 are respective schematic illustrations of different roller arrangements according to three embodiments of the invention.

Like reference characters in the respective figures denote like or analogous parts.

With reference to FIG. 1, the elastomeric article to be cured is a belt 1 in the form of a closed loop. It is wrapped over rollers 2 and 6 so that it is rather taut, not loose. Motor-driven roller 2 is a curing roller in that it is heated, for example, by heated fluid such as steam passing through its interior. Facing roller 2 concentrically along a portion 5 of its circumferential extent is an arcuate heating element 4 which also can be heated by fluid passing therethrough. Other heating means for roller 2 and element 4 can of course be employed. In any event, it is clear that as belt 1 moves along portion 5 of roller 2, said belt is uniformly heated on both sides thereof by surface 3 of roller 2 and by heat emanating from element 4.

In order, however, to assure a proper curing effect, belt 1 is pressed against said portion 5 of roller 2 by a plurality of superimposed flat bands 7,7',7'' respectively wound about roller groups 9,9'; 10,10'; 11,11'. Each roller group comprises two tensioning rollers and a take-up bobbin for alternately feeding out and winding up the corresponding band. The respective roller groups are reversibly driven in synchronism with each other.

Preferably, the bands are made of materials having a high mechanical strength, which can be different for each. Likewise, at least a part of the bands can be replaced by metal wire nets, made smooth at their surface by rubberizing.

The adoption of a plurality of flat band elements in lieu of a single steel tension band, as used in conventional apparatus, permits the exertion of a high enough pressure on the article, which, together with an appropriate operating speed and working temperature results in the article being perfectly cured regardless of the elastomeric material of which it is made.

Depending upon the geometrical and mechanical characteristics of the belt 1, it is possible to employ the most appropriate number of bands 7 or equivalent flat elements.

The apparatus may include known devices for maintaining the bands aligned with one another and with the article.

The apparatus, in the above described embodiment, is such that the curing of the belt 1 can be carried out in either a single pass by unwinding the bands 7, 7', 7'' from rollers 9, 10, 11, respectively, and by winding them on rollers 9', 10', 11' or by alternately reversing the apparatus so as to subject the belt to a plurality of passes on the heater roller 2.

Obviously, the length of the bands must be such that their travel is at least equal to the layout of the longest belt 1 which can be cured on the apparatus.

After curing, the belt 1 is removed from the apparatus in a known manner, the curing roller 2 and the idler roller 6 being stopped and brought closer together so as to slacken the belt 1. A new belt is then placed in position and is cured as was the previous one.

The embodiment of FIG. 2 differs from that of FIG. 1 only in that the respective bands 17, 17', 17'' are continuous loops and the respective roller systems therefor comprise single rollers 12, 12', 12'' whose respective axes are all in line with the axes of rollers 2 and 6. Also, there is no great need for the band to be reversibly driven as in the case of FIG. 1.

The FIG. 3 embodiment is especially suited for elastomeric articles of indefinite length, such as a sheet, band, strip, etc which is manufactured in very long lengths.

The article 18 is fed in the direction of the arrows along the surface portion 19 of heated curing roller 21 and then along a portion of roller 23 and to a take up bobbin. Heating element 41 is analogous to element 4 in the other embodiments. Band elements 22 and 22' function analogously to bands 17 in FIG. 2, the only difference being that bands 22, 22' pass from rollers 25, 25' to rollers 23 and 24 and then in reverse direction over curing roller 21. In any event, the arrangement of the pressing band rollers is such in all embodiments that the pressing bands serve to press the elastomeric article against the curing roller surface portion along which the elastomeric article is intended to pass to be subjected to the curing temperature.

In all instances, the pertinent rollers are displaceable relative to each other to adjust the tensioning of the elastomeric article as well as the tension in the pressing bands.

In any curing unit for lengthy articles, the maximum pressure which can be exerted on the article to be cured is a function of the tension which can be imparted to the metal band; on its turn said maximum tension is a function of the band thickness. If the maximum possible pressure should not be sufficient for the desired purposes, at the present stage of the technique it could not be increased, since this would involve an increase in the band thickness. This cannot be made, as said thickness is correlated to an optimum condition due to the presence of the bending tress. More precisely, for any diameter of the rollers about which the band is wound up, the band thickness cannot considerably deviate from said optimum condition. Otherwise, if the band thickness is reduced, the tensile stress would be increased beyond allowable limits; if on the contrary the band thickness is increased, the bending stress would also be increased beyond allowable limits.

What is claimed is:

1. Apparatus for curing elastomeric articles of elongated shape and continuous layout, comprising:

a heated curing roller of cylindrical shape arranged to be driven by a motor and to contact the article along a portion of its circumferential periphery whereby the article is advanced in accordance with the rotative sense of said roller; and a plurality of flexible band elements and corresponding roller means for advancing said elements in a common direction with each other and with said article, said band elements being superimposed relative to each other and passing along said portion of said curing roller and being under tension whereby they press said article against said curing roller portion, at least the flexible band element which is in direct contact with said article along said curing roller position being metallic.

2. The apparatus of claim 1, each said roller means for said band elements being reversible and comprising two reversible bobbins whereby the band elements may be fed out from one bobbin and wound up on the other and vice-versa, the curing roller also being reversible.

3. The apparatus of claim 1, said band elements each being in the form of a closed loop.

4. The apparatus of claim 3, each said band element extending in a straight line directly from a single band roller to said curing roller.

5. The apparatus of claim 3, including a pair of guiding rollers on opposite sides of said curing roller, the said band elements each extending from a respective band roller around said guide rollers and then back around the surface portion of said curing roller which faces said band roller.

6. The apparatus of claim 1, including a heating element extending in spaced relation from said curing roller along said portion thereof whereby said article receives heat simultaneously on opposite sides thereof from said curing roller and said heating element, respectively.

7. The apparatus of claim 1, said band elements being individually tensionable whereby the pressing force with which they respectively press said article against said curing roller may be individually regulated.

8. The apparatus of claim 1, wherein said metallic band is a steel band.

9. The apparatus of claim 1, wherein said metallic band is a rubberized wire net.

10. The apparatus of claim 1, wherein said flexible band elements are equal to one another.

* * * * *